UNITED STATES PATENT OFFICE.

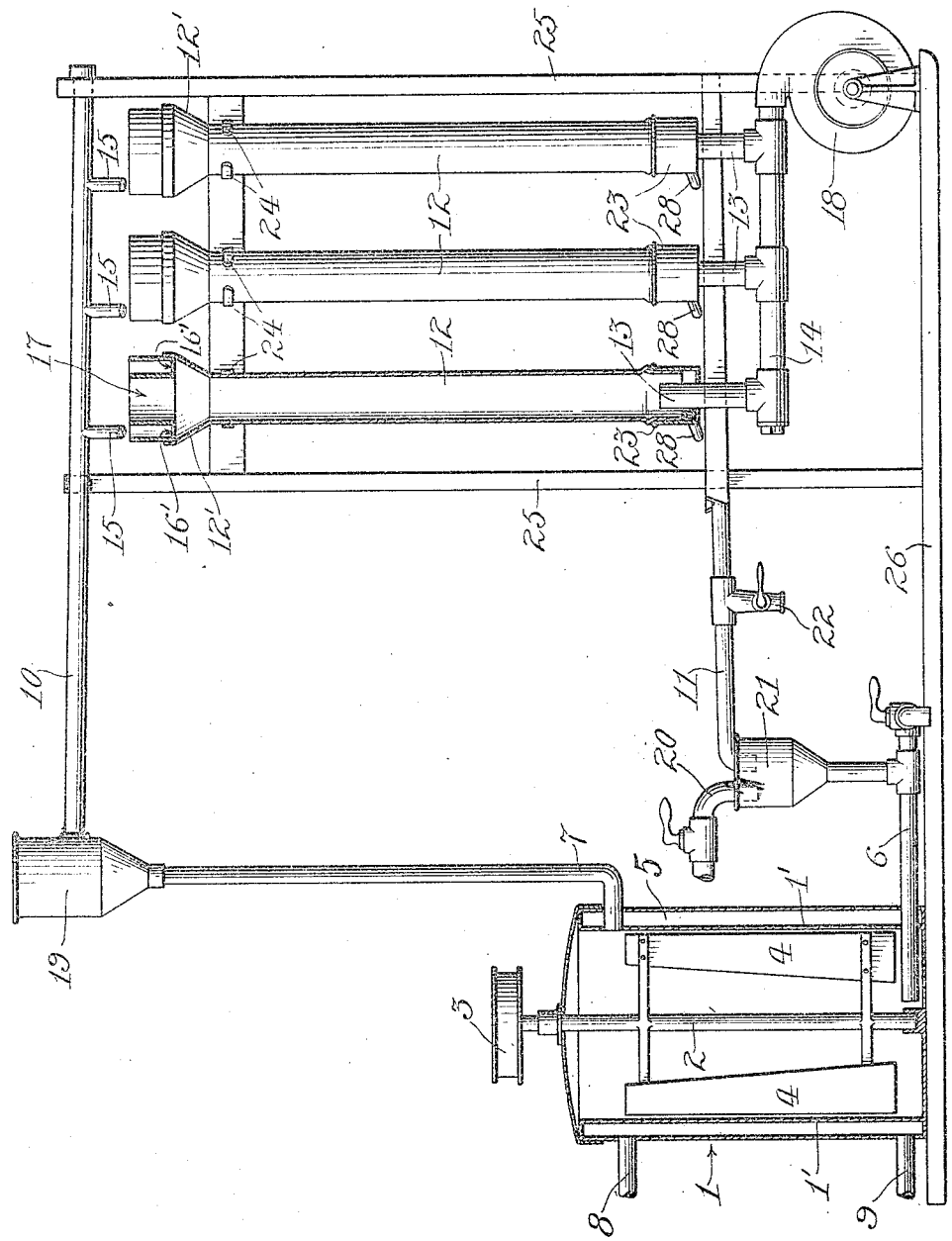

FRED D. SMITH, OF LOS ANGELES, CALIFORNIA.

EVAPORATING APPARATUS.

No. 828,343.

Specification of Letters Patent.

Patented Aug. 14, 1906.

Application filed August 1, 1905. Serial No. 272,167.

*To all whom it may concern:*

Be it known that I, FRED D. SMITH, a citizen of the United States, residing at Los Angeles, county of Los Angeles, and State of California, have invented a new and useful Evaporator for Fluids, of which the following is a specification.

This invention relates to an evaporator which is particularly designed and intended for condensation of milk; and the main object of the invention is to provide means for this apparatus which will be more economical in the operation than the means now in use.

A further object of the invention is to provide a milk-evaporating apparatus which will also serve to pasteurize, cool, and aerate the milk and remove from the milk gases and other impurities therein contained and to neutralize or overcome any sourness or incipient putrefaction or fermentation in the milk.

A further object of the invention is to provide an apparatus which can be made to operate continuously, or substantially so.

The accompanying drawing is a partly-sectional side elevation of an apparatus embodying the invention.

1 designates a device which constitutes a pump or means for causing movement or circulation of the milk or fluid. Said device is preferably in the form of an ordinary pasteurizer comprising a casing 1', wherein is mounted a vertical shaft 2, driven by power applied to the wheel or pulley 3 and paddles 4, connected to said shaft in such manner as to cause whirling or rotary movement of the milk within the casing on rotation of the shaft. An inlet-pipe 6 leads into the bottom portion of the casing 1 and terminates centrally therein, and an outlet-pipe 7 leads from the upper peripheral part of said casing, so that the centrifugal pressure on the milk due to its whirling action will tend to cause the milk to pass from the inlet to the outlet. The pasteurizer is provided with the usual steam or heating jacket 5, surrounding the same and provided with steam inlet and outlet pipes 8 9. The inlet and outlet pipes 6 and 7 are connected to the respective ends of a circulatory system of pipes, the same comprising outgoing and returning conduits 10 11, between which are connected any desired number of evaporator-tubes 12. These tubes are preferably made as individual units, each being separable from the system and being arranged so that the milk or fluid drops from the outgoing distributing-conduit into the respective tubes and drops from the respective tubes into the returning-conduit, so that no tight joints are required. Each tube 12 is provided with means for forcing air therethrough, said tubes having an air-outlet opening 17 at the top and being provided at the bottom with air-inlet tubes 13, connected to a manifold pressure-pipe 14, which is supplied with air under pressure from any suitable source, such as a blower 18. The outgoing-conduit 10 is provided with spouts, nozzles, or outlet-pipes 15, leading the milk to the respective tubes in such manner that the milk will drip into the tubes and run down the walls thereof, and to insure even and thorough distribution of the milk on and around the inner wall-faces each tube is provided at its top with a feed-cup formed as an annular trough into which the spout 15 discharges, said trough having a central air-passage 17 and having holes 16' in the peripheral portion of its bottom, said holes overlying the funnel-shaped or flaring portion 12' of the tube, so that milk falling into the annular feed-cup will run out through the said holes onto the said funnel at various points around the tube and spreading out on the funnel will cover the inner walls thereof, the feed being so regulated that the milk will thereby be exposed onto the said walls in a thin film. At the bottom of each tube an outlet-spout 28 extends therefrom into the return-conduit 11, said conduit being preferably an open-topped trough.

A tank 19 is preferably connected between the outlet-pipe 7 and the outgoing-conduit 10, so as to insure a steady supply to the evaporator-tubes.

The milk is supplied to the inlet of the pasteurizer by means of a faucet or supply connection 20, discharging into a receiver or funnel 21, connected to the inlet-pipe 6, said funnel also receiving the discharge from the return-conduit 11 aforesaid. The milk is preferably withdrawn from the system at said return-conduit by means of a faucet or cock 22, connected to said conduit.

The operation of the apparatus is as follows: The milk to be evaporated is supplied through faucet 20 and runs through funnel 21 and pipe 6 to the bottom part of the pasteurizer-casing 1. The rotary device 2 3 being set in motion causes a whirling motion of the milk, which is thereby thrown against the sides of the casing and by its centrifugal force caused to ascend along the side walls of the case and to pass upwardly into the outlet-pipe 7 to the tank 19 and thence along the outgoing-conduit 10, from which it drops from the distributing-spouts 15 into the annular cup 16 at the top of each of the evaporator-tubes. The milk runs or drips from this cup through openings 16' therein onto the conical or inclined portion 12' of the tube and thence down on the inside wall of the tube in the form of a thin film or layer. At the same time air is supplied through the air-inlet tube 13 and passes upwardly through the tube and through the discharge-opening 17 thereof. The milk being exposed to this current of air in a thin layer becomes rapidly evaporated and condensed, and at the same time the air draws off from the milk the gaseous impurities and also acts on the milk to overcome any incipient fermentation or souring in the milk. The milk so condensed passes from the bottom of the tubes 12 into the return-conduit 11, which returns it to the inlet-pipe 6, where it becomes mixed with a new supply of milk flowing from the new-supply connection 20, and the entire quantity of milk thus supplied to the casing is then returned in the same manner to the tank 19 and evaporator-tubes 12 to undergo further evaporation. When the fluid or condensed milk returning in the conduit 11 has attained the proper degree of condensation or consistency, it can be drawn off continually or from time to time through the faucet 22. It is found in practice that by the action of oxygen of the air on the milk that contains products of incipient fermentation the milk can be made non-odorous or "sweet." An important feature of the invention in this connection is the fact that the evaporator-tubes are exposed externally to the outer air for cooling the tubes and the stream of milk passing therein. This cooling is further aided and accelerated by the current of air forced upwardly through the tubes, said current of air serving to carry away the heat of the milk by contact and also by the well-known refrigerating effect due to the rapid evaporation from the liquid-surface. This is of importance, as the pasteurization requires considerable heat, and the milk should not be left longer than possible in this heated condition and should be cooled with the utmost rapidity to normal temperature.

By the above-described apparatus the evaporating, aerating, and cooling functions are all performed simultaneously and in a minimum space of time and at a minimum expense.

The delivery-conduit 11 is located in a plane below the distributing-pipe 10, and the fluid inlets and outlets of the tubes are respectively below the outlets 15 and above the conduit 11 and in each case out of contact therewith, so that there are no joints to become clogged or fouled with milk. The air-supply nozzles 13 extend up through the bottom of the evaporator-tubes, the latter fitting them and being removable therefrom.

An important feature of the process is that it may be made continuous, the milk being continually withdrawn at 22, an equivalent quantity of unevaporated milk being continually supplied at 20.

The apparatus is equally applicable to the evaporation, purification, and sweetening of cream as well as of milk and may be used for other purposes.

Various changes may be made in the construction of the parts without departing from the invention.

In order to facilitate the separation of the tubes 12 from the system, said tubes may be set removably into cups 23 and may be supported at the top by clamp or clip means 24. 25 designates a frame or support for the various parts connected to a suitable base 26, which may be formed as a skid, so that the entire apparatus is portable or movable from place to place.

What I claim is—

An apparatus for the evaporation of fluids comprising a casing provided with fluid inlet and outlet at different portions thereof and rotary fluid-impelling means within said casing to drive the fluid from the inlet to the outlet, means for applying heat to said casing, a tank connected to the outlet, a conduit connected to said tank and provided with a plurality of outlets, a plurality of detachably-supported evaporator-tubes having annular cups at their upper ends arranged beneath said outlets to receive the discharge from said outlets, the central opening in said annular cups forming air-outlet means at their upper ends and air-inlet and fluid-outlet means at their lower ends, the said tubes being exposed exteriorly for cooling thereof, a conduit arranged to receive the discharge from said outlet means of the tubes and provided with means for drawing off fluid therefrom, a receiver connected to the inlet for the aforesaid casing to receive the discharge from the last-named conduit, and feed-supply means discharging into the said receiver.

In testimony whereof I have hereunto set my hand, at Los Angeles, California, this 17th day of July, 1905.

FRED D. SMITH.

In presence of—
ARTHUR P. KNIGHT,
FRANK S. A. GRAHAM.